July 31, 1923.

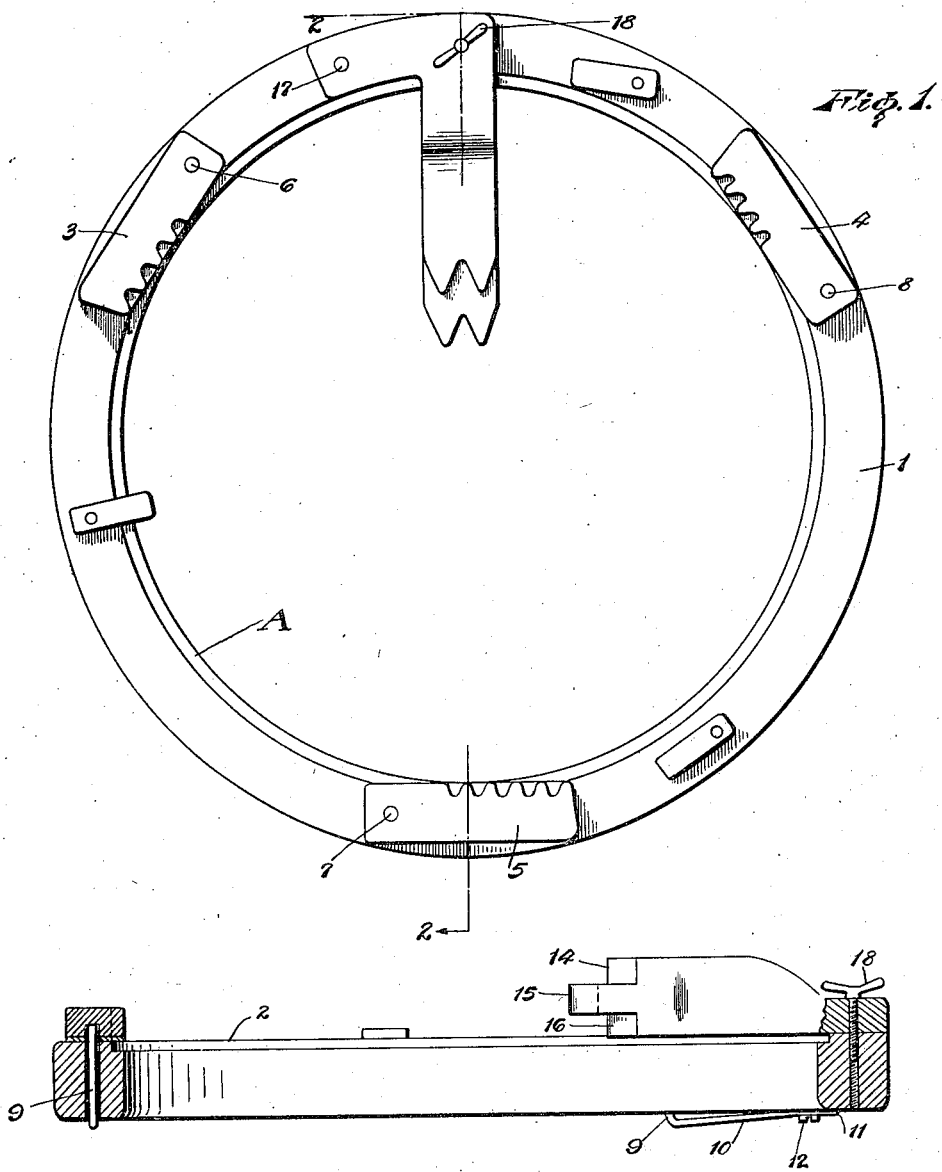

C. A. JOHNSON

GEAR ASSEMBLING DEVICE

Filed Dec. 14, 1920

Inventor

C. A. Johnson.

By Lacey & Lacey, Attorneys

July 31, 1923.

C. A. JOHNSON

GEAR ASSEMBLING DEVICE

Filed Dec. 14, 1920

Inventor
C. A. Johnson.
By
Lacey & Lacey, Attorneys

Patented July 31, 1923.

1,463,269

UNITED STATES PATENT OFFICE.

CLARENCE A. JOHNSON, OF LUTHER, OKLAHOMA.

GEAR-ASSEMBLING DEVICE.

Application filed December 14, 1920. Serial No. 430,633.

*To all whom it may concern:*

Be it known that I, CLARENCE A. JOHNSON, a citizen of the United States, residing at Luther, in the county of Oklahoma and State of Oklahoma, have invented certain new and useful Improvements in Gear-Assembling Devices, of which the following is a specification.

This invention relates to a labor saving device for use in assembling the sun and planet gears of a transmission, and has particular reference to the type of planetary transmission which is used in the present day "Ford" motor vehicle.

At the present time it is customary, in assembling the "Ford" transmission, for the mechanic to place the brake drum on a flat surface with the hub thereof in a vertical position and then successively superpose on this the slow speed and reverse drums with the gears of each drum uppermost; the driven or sun gear is then placed on the hub with the teeth downward next to the slow speed gear. When this much of the assembling has been done the triple or planet gears are placed in mesh with the superposed low speed reverse and driven or sun gears and rest on the uppermost face of the reverse drum, care being taken that these triple gears are meshed with the other gears according to the marking on the gears. Next the fly wheel with its transmission shaft and triple gear pins is placed face downward on a flat surface and the previously assembled drums and gears are inverted and slid onto the transmission shaft in such position that the triple gears are received on the triple gear pins carried by the fly wheel.

However, in order to hold the gears in position during the step of inverting and placing them on the fly wheel it has been customary to tie them in place by passing a cord around the assembled gears on the outside of the same. This step is unsatisfactorily inasmuch as it is difficult to tie the gears together sufficiently tight to prevent their turning and slipping, with the result that considerable difficulty is encountered and a great deal of valuable time lost in performing this step in the assembly of the transmission. In the assembly of thousands of motor vehicles the loss of a few moments time on each vehicle is a large factor and therefore the present invention has as its object the provision of a labor-saving device for use in positively holding the above referred to gears against displacement at this particular step in the assembling of the transmission, and which device is easily removed on completion of the said step.

In the drawings:

Figure 1 is a plan view of the device;

Figure 2 is a section on the line 2—2 of Figure 1;

Figure 3:
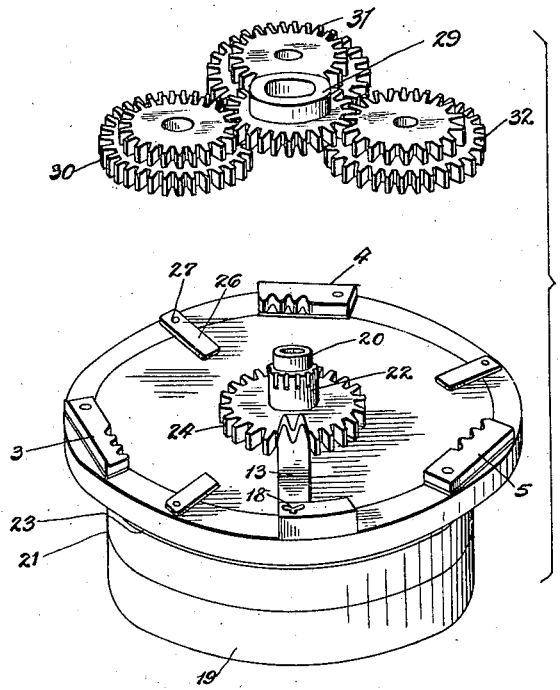
Figure 3 is a perspectve view showing the device in position ready to receive the gears.
Figure 4:
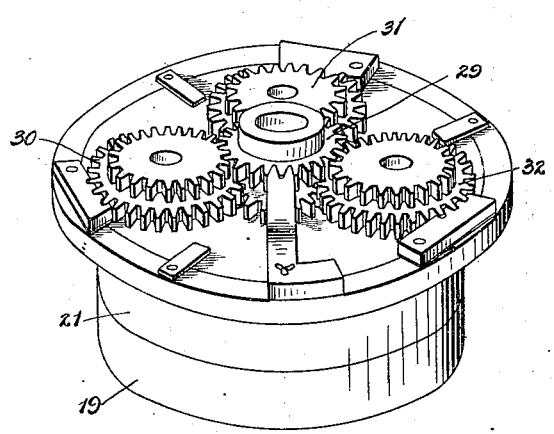
Figure 4 is a perspective view showing the gears in position in the device.
Figure 5:
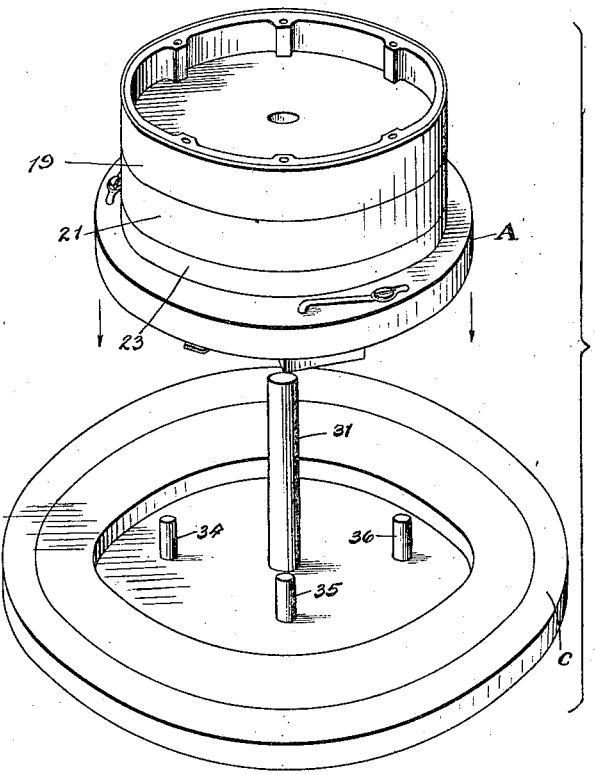
Figure 5 is a perspective view showing the device and the gears in position and inverted for assembling to the fly wheel.

In detail:

The labor saving device is indicated in general by the reference character A and comprises a ring 1 having the counterbored shoulder 2 on one side. At equi-distant points on the counterbored face are mounted triple gear engaging lugs 3, 4 and 5 pivoted at 6, 8 and 7 respectively and engaged beneath by the ends 9 of spring arms 10 each fastened as at 11 to the ring, the springs being further held by means 12 which also forms fulcrums. By reason of the construction of these springs and their arrangement in connection with the ring and lugs, the spring ends 9 may be disengaged for swinging the triple gear engaging lugs 3, 4 and 5 outwardly for the purpose to be hereinafter set forth.

Between two of the triple gear engaging lugs, as for instance 3 and 5, there is removably mounted a toothed sun gear engaging arm 13 having the triple end indicated at 14, 15, 16, and said arm 13 is held by a lug 17 and a thumb screw 18. Spaced at equi-distant points around the ring and between the triple gear engaging lugs are clips 26 pivoted at 27.

The "Ford" transmission indicated at B in general comprises the brake drum 19 having the hollow shaft 20 upon which is superposed the slow speed drum 21 with its hub gear 22 over which the reverse drum 23 with its gear 24 is placed.

When this much of the transmission has been assembled the labor saving device A is placed thereon by slipping it over the assembled drums from the bottom until it reaches a position wherein the flange 28 of the reverse drum 23 seats flush in the counterbore of the ring 1 and the clips 26 fulcrumed at 27 are then turned inwardly to the position shown in Figures 2 and 3. At this juncture the sun gear or driven gear 29 is placed in its central position and the arm 13 is fastened in position by the thumb screw 18 with its teeth 16 engaging the reverse gear 24 while the teeth 14 and 15 engage the driven and slow speed gears respectively. Next the triple gears 30, 31 and 32 are placed in mesh with the sun gears and with the triple gear engaging lugs 3, 4 and 5 and the assembled unit thus formed is ready to be inverted and superposed on the fly wheel C carrying the transmission shaft 33 and the triple gear pins 34, 35 and 36. It will thus be seen that the gears are held firmly in assembled relation during the inverting and consequently may be easily placed upon the fly wheel.

Figure 6:
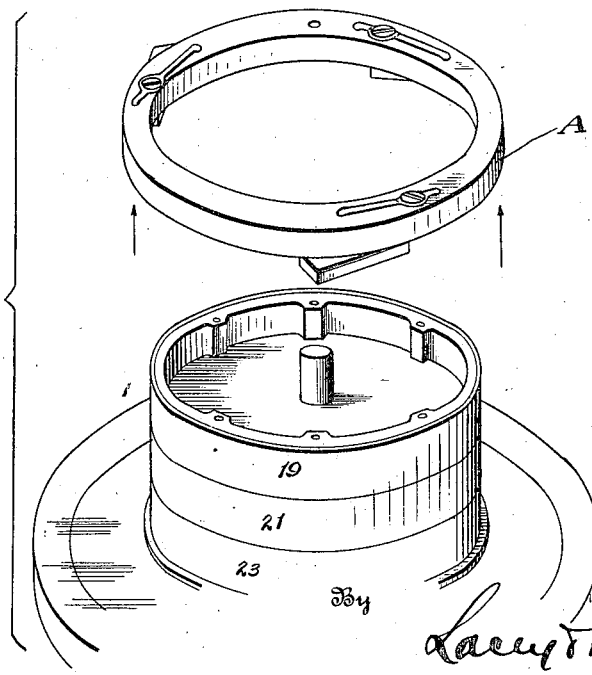
Figure 6 is a perspective view showing the assembling step completed and the device being removed.

Before the gears are to be placed upon the fly wheel the thumb screw 18 is loosened and the lug 13 removed; after the gears have been placed upon the fly wheel, then the clips 26 and the lugs 3, 4 and 5 are swung outwardly and the entire ring withdrawn in the manner shown in Figure 6.

It will be seen that the foregoing labor saving device is far superior to tying gears with a cord for assembling purposes.

It will be evident that after the gears and drums have been assembled on the frame A, the fly wheel C might be dropped upon the assembled parts instead of first inverting these parts and placing them on top of the fly wheel.

I claim:

1. A gear assembling device including a frame, and means carried thereby for locking against rotation temporarily assembled gears confined by said means.

2. A gear assembling device including a frame, locking means carried by the frame above the plane thereof, and intermeshing gears within the frame and held in relative assembled position by said locking means.

3. The method of assembling gears consisting in supporting the gears in relative assembled position in a frame temporarily carried by a body, inverting the body and assembling the inverted body and gears on a permanent mounting, and then removing the temporary frame.

4. A method of assembling gears including a flanged body consisting in supporting the gears in relative assembled relation in a frame, said frame being previously engaged with said flanged body; locking the frame to the flanged body; assembling the body and gears to a permanent mounting, and unlocking and removing the frame from the body.

5. A gear assembling device including a ring frame, and toothed lugs carried thereby for locking against rotation temporarily assembled gears confined by said lugs.

6. A gear assembling device including a ring frame, and toothed lugs carried thereby for locking against rotation temporarily assembled gears confined by said lugs, one of said lugs being bodily removable to release the gears.

7. A gear assembling device including a ring frame, and toothed lugs carried thereby for locking against rotation temporarily assembled gears confined by said lugs, one of said lugs being bodily removable to release the gears and the other lugs mounted for pivotal movement away from said gears.

In testimony whereof I affix my signature.

CLARENCE A. JOHNSON.